(12) United States Patent
Wang et al.

(10) Patent No.: US 11,852,520 B1
(45) Date of Patent: Dec. 26, 2023

(54) METHOD FOR DETERMINING REFLECTIVE SURFACE OF STEERING GEAR AND FOCUSING STEERING GEAR OF EXTERNAL LEVEL GAUGE

(71) Applicant: XI'AN DINGHUA ELECTRONICS CO., LTD., Xi'an (CN)

(72) Inventors: Dinghua Wang, Xi'an (CN); Rui Wang, Xi'an (CN); Pu Wang, Xi'an (CN)

(73) Assignee: XI'AN DINGHUA ELECTRONICS CO., LTD., Xi'an (CN)

( * ) Notice: Subject to any disclaimer, the term of this patent is extended or adjusted under 35 U.S.C. 154(b) by 0 days.

(21) Appl. No.: 18/259,564

(22) PCT Filed: May 7, 2021

(86) PCT No.: PCT/CN2021/092086
§ 371 (c)(1),
(2) Date: Jun. 27, 2023

(87) PCT Pub. No.: WO2022/142047
PCT Pub. Date: Jul. 7, 2022

(30) Foreign Application Priority Data

Dec. 28, 2020 (CN) .......................... 202011574832.6

(51) Int. Cl.
*G01F 23/296* (2022.01)
*G01S 7/521* (2006.01)

(52) U.S. Cl.
CPC ............ *G01F 23/296* (2013.01); *G01S 7/521* (2013.01)

(58) Field of Classification Search
CPC ........... G01F 23/296; G01F 23/28; G01S 7/52
See application file for complete search history.

(56) References Cited

FOREIGN PATENT DOCUMENTS

| CN | 102866491 | 1/2013 |
|---|---|---|
| CN | 106910245 | 6/2017 |

(Continued)

OTHER PUBLICATIONS

Decision to Grant dated Aug. 26, 2021, issued in Chinese Application No. 202011574832.6.

(Continued)

*Primary Examiner* — Tarun Sinha
*Assistant Examiner* — Drexel Alejandro Venero
(74) *Attorney, Agent, or Firm* — DLA PIPER LLP (US)

(57) ABSTRACT

The present disclosure discloses a method for determining a reflective surface of a steering gear and a focusing steering gear of an external level gauge. The method includes: obtaining a focal length and a specific reflection angle (101); determining an $0^{th}$ step reflective surface (102) of the reflective surface of the steering gear based on the focal length and the specific reflection angle; determining an adjacent step reflective surface (103) by a geometric method based on the $0^{th}$ step reflective surface; and if a number of steps of the reflective surface of the steering gear reaches a preset value, determining the reflective surface (104) of the steering gear based on the $0^{th}$ step reflective surface and the adjacent step reflective surface. According to the present disclosure, a liquid level can be measured at an outer side of a side wall of a vertical liquid storage tank.

15 Claims, 3 Drawing Sheets

(56) References Cited

FOREIGN PATENT DOCUMENTS

| CN | 109883514 | | 6/2019 |
|----|-----------|---|--------|
| CN | 109883514 A | * | 6/2019 |
| CN | 208998887 | | 6/2019 |
| CN | 112729470 | | 4/2021 |
| JP | 61-290378 | | 12/1986 |

OTHER PUBLICATIONS

Office Action dated Jul. 16, 2021, issued in Chinese Application No. 202011574832.6.

PCT International Application No. PCT/CN21/92086, International Search Report and Written Opinion of the International Searching Authority, dated Sep. 28, 2021, 4 pages.

* cited by examiner

METHOD FOR DETERMINING REFLECTIVE SURFACE OF STEERING GEAR AND FOCUSING STEERING GEAR OF EXTERNAL LEVEL GAUGE

CROSS REFERENCE TO RELATED APPLICATION

The present application is a national stage application of International Patent Application No. PCT/CN2021/092086, filed on May 7, 2021, which claims priority to the Chinese Patent Application No. 202011574832.6, filed with the China National Intellectual Property Administration on Dec. 28, 2020, and entitled "METHOD FOR DETERMINING REFLECTIVE SURFACE OF STEERING GEAR AND FOCUSING STEERING GEAR OF EXTERNAL LEVEL GAUGE", which is incorporated herein by reference in its entirety.

TECHNICAL FIELD

The present disclosure relates to the field of liquid level measuring technologies, and in particular, to a method for determining a reflective surface of a steering gear and a focusing steering gear of an external level gauge.

BACKGROUND

It is very common for petrochemical and chemical enterprises to measure a liquid level at an outer side of a liquid storage tank by an external level gauge. However, a vertical tank accounts for the vast majority of the liquid storage tank. Because a body of the vertical tank is mounted on a cement foundation, under a bottom of the tank, there is no suspended space for mounting a measuring head. The measuring head can only be mounted outside a side wall of the liquid storage tank, and a steering gear is mounted in the tank. An ultrasonic wave emitted by the measuring head is reflected at 45° by the steering gear to a liquid surface, and an echo from the liquid surface is reflected at 45° by the steering gear to the measuring head again. An included angle between the reflective surface of the steering gear and a horizontal plane is 45°.

A flat reflective surface doubles an error $\theta$ of an incidence angle of the ultrasonic wave emitted by the measuring head to $2\theta$, and then the ultrasonic wave is reflected to the liquid surface. The liquid surface doubles an error of an incidence angle of an ultrasonic wave reflected by the steering gear to $4\theta$, and then the ultrasonic wave is reflected to the steering gear. The steering gear doubles an error of an incidence angle to $8\theta$ again, and then the ultrasonic wave is reflected to the measuring head. For example, if the error of the incidence angle of the ultrasonic wave emitted by the measuring head is $\theta=4°$, after an echo is reflected for three times, namely, reflected by the steering gear, the liquid surface, and the steering gear, and transmitted to the measuring head, an error of an incidence angle of the echo is $2^3 \ast 4° = 32°$. As a result, the echo is seriously offset from the measuring head. Therefore, the measuring head does not receive the echo completely, resulting that the measurement fails. This is a main reason why the steering gear of the external level gauge cannot be used in the vertical tank.

SUMMARY

An objective of the present disclosure is to provide a method for determining a reflective surface of a steering gear and a focusing steering gear of an external level gauge, to measure a liquid level at an outer side of a side wall of a vertical liquid storage tank.

Technical solutions of the present disclosure are as follows:

A method for determining a reflective surface of a steering gear includes: obtaining a focal length and a specific reflection angle, where the focal length is a distance between a ray source and a center of the reflective surface of the steering gear, and the specific reflection angle is an exit angle of an ultrasonic wave reflected by the reflective surface of the steering gear; determining a $0^{th}$ step reflective surface of the reflective surface of the steering gear based on the focal length and the specific reflection angle; determining an adjacent step reflective surface by a geometric method based on the $0^{th}$ step reflective surface, where the adjacent step reflective surface includes a positive step reflective surface and a negative step reflective surface; and if a number of steps of the reflective surface of the steering gear reaches a preset value, determining the reflective surface of the steering gear based on the $0^{th}$ step reflective surface and the adjacent step reflective surface.

Optionally, the determining a $0^{th}$ step reflective surface of the reflective surface of the steering gear based on the focal length and the specific reflection angle specifically includes: determining a unit angle of the reflective surface of the steering gear based on the focal length, where the unit angle is an included angle between a first side and a second side, the first side is a connecting line between a first end point of a longitudinal section of each step reflective surface and the ray source, and the second side is a connecting line between a second end point of the longitudinal section of each step reflective surface and the ray source; determining an inclination angle of the $0^{th}$ step reflective surface of the reflective surface of the steering gear based on the specific reflection angle, where the inclination angle of the $0^{th}$ step reflective surface of the reflective surface of the steering gear is an included angle between the $0^{th}$ step reflective surface of the reflective surface of the steering gear and a horizontal plane; determining side coordinates of the $0^{th}$ step reflective surface of the reflective surface of the steering gear based on the focal length, the unit angle, and the inclination angle of the $0^{th}$ step reflective surface of the reflective surface of the steering gear; and determining the $0^{th}$ step reflective surface of the reflective surface of the steering gear based on the side coordinates of the $0^{th}$ step reflective surface.

Optionally, the determining an adjacent step reflective surface by a geometric method based on the $0^{th}$ step reflective surface specifically includes: determining side coordinates of the adjacent step reflective surface by a reflection law based on the unit angle and the side coordinates of the $0^{th}$ step reflective surface; and determining the adjacent step reflective surface based on the side coordinates of the adjacent step reflective surface.

Optionally, the determining side coordinates of the adjacent step reflective surface by a reflection law based on the unit angle and the side coordinates of the $0^{th}$ step reflective surface specifically includes: if a number N of steps of the reflective surface is a positive integer, determining the side coordinates of the adjacent step reflective surface based on the unit angle according to the following equations:

$$(X_N, Y_N) = F((X_{N-1}, Y_{N-1}), l, c),$$

$$(X_0, Y_0) = (X_{+0}, Y_{+0}), \text{ where}$$

$(X_N, Y_N)$ represents side coordinates of an $N^{th}$ step reflective surface, $(X_{N-1}, Y_{N-1})$ represents side coordinates of an $(N-1)^{th}$ step reflective surface, c represents the unit angle, l represents the focal length, $(X_0, Y_0)$ represents side coordinates of the $0^{th}$ reflective surface, and $(X_{+0}, Y_{+0})$ represents side coordinate values of a $1^{st}$ step reflective surface in a first quadrant; or if a number N of steps of the reflective surface is a negative integer, determining the side coordinates of the adjacent step reflective surface based on the unit angle according to the following equations:

$$(X_N, Y_N) = F((X_{N+1}, Y_{N+1}), l, c),$$

$$(X_0, Y_0) = (X_{-0}, Y_{-0}),\ \text{where}$$

$(X_{N+1}, Y_{N+1})$ represents side coordinates of an $(N+1)^{th}$ step reflective surface, and $(X_{-0}, Y_{-0})$ represents side coordinate values of the $0^{th}$ step reflective surface in a third quadrant.

Optionally, after the determining the reflective surface of the steering gear based on the $0^{th}$ step reflective surface and the adjacent step reflective surface, the method further includes: storing the side coordinates, the focal length, and the unit angle of the adjacent step reflective surface into a database, where the database is configured to inquire the reflective surface of the steering gear.

Optionally, the determining an adjacent step reflective surface by a geometric method based on the $0^{th}$ step reflective surface specifically includes: determining a unit length of the reflective surface of the steering gear based on the focal length, where the unit length is a longitudinal cross-sectional length of each step reflective surface; determining the side coordinates of the adjacent step reflective surface by the reflection law based on the unit length and the $0^{th}$ step reflective surface; and determining the adjacent step reflective surface based on the side coordinates of the adjacent step reflective surface.

The present disclosure further describes a focusing steering gear of an external level gauge. The focusing steering gear of an external level gauge includes a reflective surface of a steering gear determined by any above-mentioned method for determining a reflective surface of a steering gear.

An included angle between the included angle between the $0^{th}$ step reflective surface of the reflective surface of the steering gear and a horizontal plane is a specific angle, to enable a direction of the ultrasonic wave reflected by the reflective surface of the steering gear to be a specific reflection angle. A midpoint of the $0^{th}$ step reflective surface of the reflective surface of the steering gear and the ray source are located in a same horizontal plane. The ray source is disposed on a concave side of the reflective surface of the steering gear. A transverse cross section of the reflective surface of the steering gear is an arc surface.

Optionally, a first side edge and a second side edge of the reflective surface of the steering gear are respectively in contact with an inner surface of a side wall of a liquid tank. The first side edge is a connecting line between end points on arc-shaped sides of adjacent step reflective surfaces of the reflective surface of the steering gear. The second side edge is a connecting line of end points on other sides of the arc-shaped sides of the adjacent step reflective surfaces of the reflective surface of the steering gear.

Optionally, the reflective surface of the steering gear includes the $0^{th}$ step reflective surface and the negative step reflective surface.

Optionally, the reflective surface of the steering gear includes the $0^{th}$ step reflective surface and the positive step reflective surface.

Compared with the prior art, the present disclosure has the following advantages.

According to the method for determining a reflective surface of a steering gear and the focusing steering gear of an external level gauge provided in the present disclosure, the $0^{th}$ step reflective surface of the reflective surface of the steering gear is determined based on the focal length and the specific reflection angle, the adjacent step reflective surface is determined by the geometric method based on the $0^{th}$ step reflective surface, the reflective surface of the steering gear is determined based on the $0^{th}$ step reflective surface and the adjacent step reflective surface, and the reflective surface of the steering gear is designed as a multi-step reflective surface, so that the ultrasonic wave emitted by the ray source is reflected to the liquid surface by the multi-step reflective surface of the reflective surface of the steering gear, to measure the liquid level at the outer side of the side wall of the vertical liquid storage tank.

BRIEF DESCRIPTION OF THE DRAWINGS

The present disclosure will be further described below with reference to the accompanying drawings.

DETAILED DESCRIPTION OF THE EMBODIMENTS

The technical solutions in embodiments of the present disclosure will be described in detail below with reference to the accompanying drawings in the embodiments of the present disclosure. Apparently, the described embodiments are merely a part rather than all of the embodiments of the present disclosure. All other embodiments derived from the embodiments in the present disclosure by a person of ordinary skill in the art without creative work shall fall within the protection scope of the present disclosure.

In view of a defect that a steering gear of an external level gauge cannot be used in a vertical tank, the present disclosure provides a method for determining a reflective surface of a steering gear and a focusing steering gear of an external level gauge, to measure a liquid level at an outer side of a side wall of a vertical liquid storage tank.

To make the above objectives, features, and advantages of the present disclosure clearer and more comprehensible, the present disclosure will be further described in detail below with reference to the accompanying drawings and the specific examples.

Embodiment 1

Figure 1:
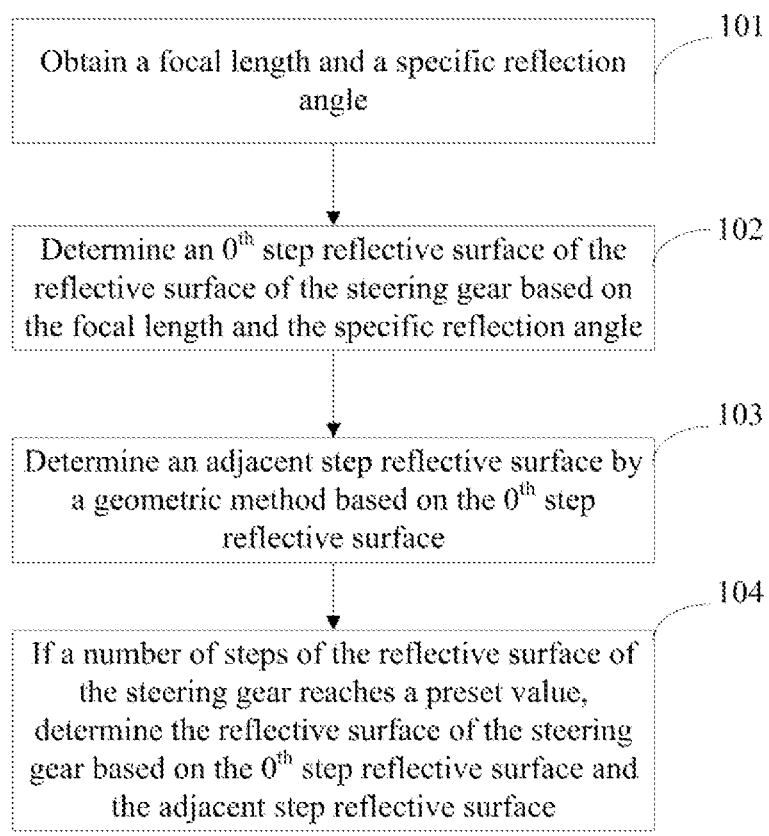
FIG. 1 is a flowchart of a method for determining a reflective surface of a steering gear according to the present disclosure.

As shown in FIG. 1, a method for determining a reflective surface of a steering gear provided in the present disclosure includes the following steps.

Step 101: Obtain a focal length and a specific reflection angle, where the focal length is a distance between a ray source and a center of the reflective surface of the steering gear, and the specific reflection angle is an exit angle of an ultrasonic wave reflected by the reflective surface of the steering gear.

Step 102: Determine a $0^{th}$ step reflective surface of the reflective surface of the steering gear based on the focal length and the specific reflection angle.

Step 103: Determine an adjacent step reflective surface by a geometric method based on the $0^{th}$ step reflective surface, where the adjacent step reflective surface includes a positive step reflective surface and a negative step reflective surface.

Step 104: If a number of steps of the reflective surface of the steering gear reaches a preset value, determine the reflective surface of the steering gear based on the $0^{th}$ step reflective surface and the adjacent step reflective surface.

In an optional implementation, the determining a $0^{th}$ step reflective surface of the reflective surface of the steering gear based on the focal length and the specific reflection angle specifically includes: determining a unit angle of the reflective surface of the steering gear based on the focal length, where the unit angle is an included angle between a first side and a second side, the first side is a connecting line between a first end point of a longitudinal section of each step reflective surface and the ray source, and the second side is a connecting line between a second end point of the longitudinal section of each step reflective surface and the ray source; determining an inclination angle of the $0^{th}$ step reflective surface of the reflective surface of the steering gear based on the specific reflection angle, where the inclination angle of the $0^{th}$ step reflective surface of the reflective surface of the steering gear is an included angle between the $0^{th}$ step reflective surface of the reflective surface of the steering gear and a horizontal plane; determining side coordinates of the $0^{th}$ step reflective surface of the reflective surface of the steering gear based on the focal length, the unit angle, and the inclination angle of the $0^{th}$ step reflective surface of the reflective surface of the steering gear; and determining the $0^{th}$ step reflective surface of the reflective surface of the steering gear based on the side coordinates of the $0^{th}$ step reflective surface.

Optionally, the determining an adjacent step reflective surface by a geometric method based on the $0^{th}$ step reflective surface specifically includes: determining side coordinates of the adjacent step reflective surface by a reflection law based on the unit angle and the side coordinates of the $0^{th}$ step reflective surface; and determining the adjacent step reflective surface based on the side coordinates of the adjacent step reflective surface. The determining side coordinates of the adjacent step reflective surface by a reflection law based on the unit angle and the side coordinates of the $0^{th}$ step reflective surface specifically includes: if a number N of steps of the reflective surface is a positive integer, determining the side coordinates of the adjacent step reflective surface based on the unit angle according to the following equations:

$$(X_N, Y_N) = F((X_{N-1}, Y_{N-1}), l, c),$$

$$(X_0, Y_0) = (X_{+0}, Y_{+0}), \text{ where}$$

$(X_N, Y_N)$ represents side coordinates of an $N^{th}$ step reflective surface, $(X_{N-1}, Y_{N-1})$ represents side coordinates of an $(N-1)^{th}$ step reflective surface, c represents the unit angle, l represents the focal length, $(X_0, Y_0)$ represents side coordinates of the $0^{th}$ reflective surface, and $(X_{+0}, Y_{+0})$ represents side coordinate values of a $1^{st}$ step reflective surface in a first quadrant; or if a number N of steps of the reflective surface is a negative integer, determining the side coordinates of the adjacent step reflective surface based on the unit angle according to the following equations:

$$(X_N, Y_N) = F((X_{N+1}, Y_{N+1}), l, c),$$

$$(X_0, Y_0) = (X_{-0}, Y_{-0}), \text{ where}$$

$(X_{N+1}, Y_{N+1})$ represents side coordinates of an $(N+1)^{th}$ step reflective surface, and $(X_{-0}, Y_{-0})$ represents side coordinate values of the $0^{th}$ step reflective surface in a third quadrant.

After the determining the reflective surface of the steering gear based on the $0^{th}$ step reflective surface and the adjacent step reflective surface, the method further includes: storing the side coordinates, the focal length, and the unit angle of the adjacent step reflective surface into a database, where the database is configured to inquire the reflective surface of the steering gear.

In an optional implementation, the determining an adjacent step reflective surface by a geometric method based on the $0^{th}$ step reflective surface specifically includes: determining a unit length of the reflective surface of the steering gear based on the focal length, where the unit length is a longitudinal cross-sectional length of each step reflective surface; determining the side coordinates of the adjacent step reflective surface by the reflection law based on the unit length and the $0^{th}$ step reflective surface; and determining the adjacent step reflective surface based on the side coordinates of the adjacent step reflective surface.

Embodiment 2

A focusing steering gear of an external level gauge provided by the present disclosure includes a reflective surface of a steering gear determined by the method for determining a reflective surface of a steering gear according to the method for determining a reflective surface of a steering gear in embodiment 1.

An included angle between the included angle between the $0^{th}$ step reflective surface of the reflective surface of the steering gear and a horizontal plane is a specific angle, to enable a direction of the ultrasonic wave reflected by the reflective surface of the steering gear to be a preset direction. A midpoint of the $0^{th}$ step reflective surface of the reflective surface of the steering gear and the ray source are located in a same horizontal plane. The ray source is disposed on a concave side of the reflective surface of the steering gear. A transverse cross section of the reflective surface of the steering gear is an arc surface.

In an optional implementation, a first side edge and a second side edge of the reflective surface of the steering gear are respectively in contact with an inner surface of a side wall of a liquid tank. The first side edge is a connecting line between end points on arc-shaped sides of adjacent step reflective surfaces of the reflective surface of the steering gear. The second side edge is a connecting line of end points on other sides of the arc-shaped sides of the adjacent step reflective surfaces of the reflective surface of the steering gear.

In an optional implementation, the reflective surface of the steering gear includes the $0^{th}$ step reflective surface and the negative step reflective surface.

In an optional implementation, the reflective surface of the steering gear includes the $0^{th}$ step reflective surface and the positive step reflective surface.

Embodiment 3

In an implementation of a focusing steering gear of an external level gauge provided in this embodiment, the reflective surface of the steering gear is a focus reflective surface. An error of angle θ of an ultrasonic wave emitted by a measuring head in a direction is eliminated to 0° after the ultrasonic wave is reflected by the steering gear. Based on a property of the reflective surface of the steering gear, after ultrasonic waves emitted from a measuring head and scattered in all directions are reflected by the reflective surface of the steering gear, the ultrasonic waves are vertically reflected to the liquid surface, and then reflected by the liquid surface back to the reflective surface of the steering gear. After the ultrasonic waves are reflected by the reflective surface of the steering gear again, the ultrasonic waves are focused on the measuring head, so that an echo signal is greatly enhanced. Therefore, the steering gear is referred to as the focusing steering gear. An objective of conveniently measuring a liquid level of a vertical tank at an outer side of a side wall of the vertical tank by the focusing steering gear of an external level gauge is achieved.

Figure 2:
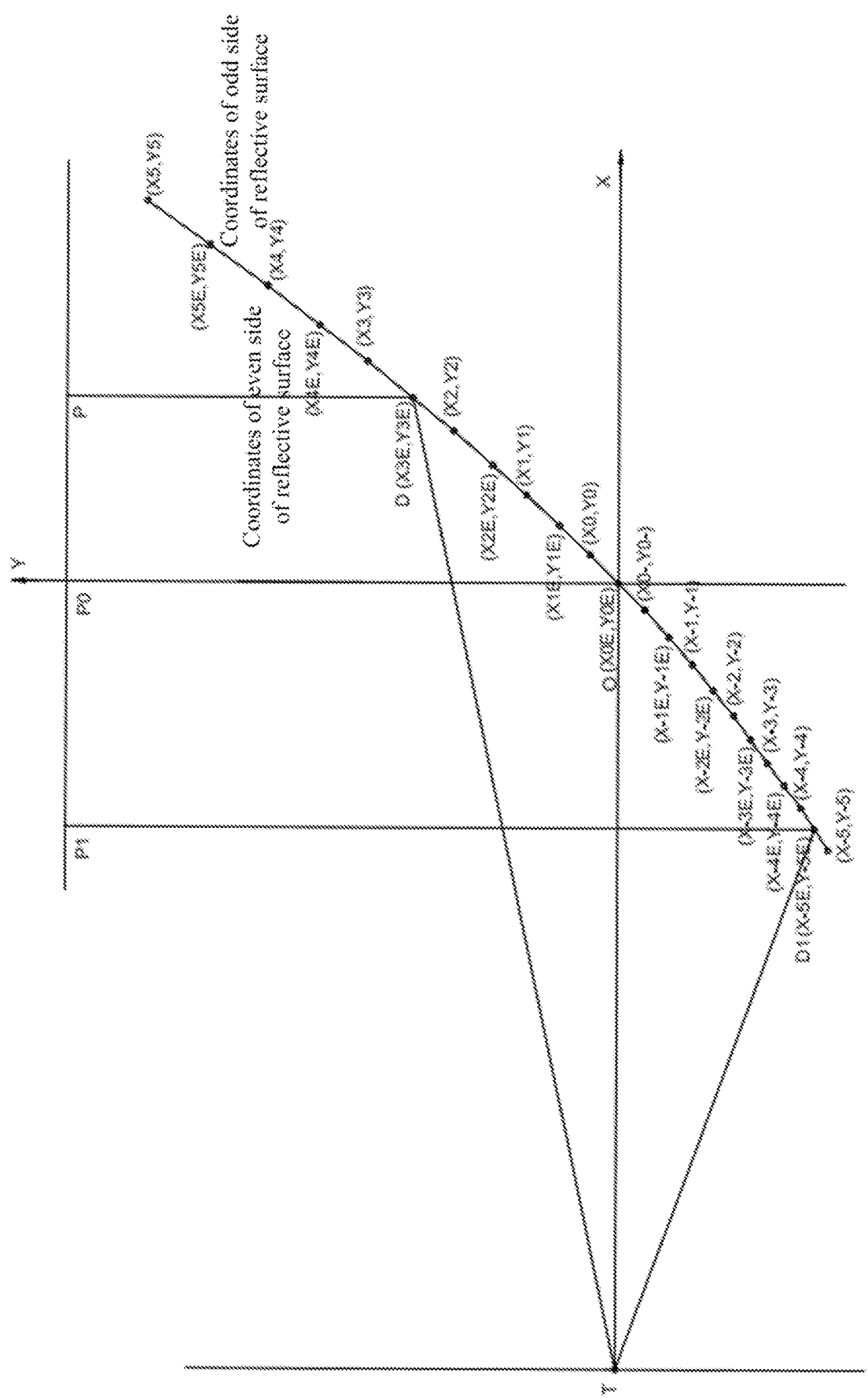
FIG. 2 is a front view of a reflective surface of a steering gear according to the present disclosure.

Specifically, as shown in FIG. 2, OXYZ is a right-hand three-dimensional rectangular coordinate system, where coordinate axes OX and OY are on a paper, OX is horizontal to the right, OY is vertical to upward, OZ is a paper exit direction, and O being an origin of coordinates. T is an ultrasonic wave source through which an ultrasonic wave emitted by the measuring head is transmitted from the outside into the tank and emitted from an inner surface of the side wall, that is, a ray source. A ray source T is located at a negative value on the OX axis, a distance between the ray source T and an origin O of coordinates is a focal length l, and the reflective surface of the focusing steering gear is processed into a shape of the reflective surface of the steering gear. A center point of the reflective surface of the steering gear is the origin O of coordinates. It is assumed that an ultrasonic wave emitted from T to O is emitted to any point D on the reflective surface of the steering gear due to a direction error. According to the reflective surface of the steering gear provided in this embodiment, a ray emitted from a focal point to any point on the reflective surface of the steering gear is transmitted to a preset direction after being reflected. In this embodiment, the preset direction is vertical upward. That is, TD is reflected as a vertical upward DP by the reflective surface of the steering gear, and P is a point on the liquid surface. Because DP is perpendicular to the liquid surface, a reflected line PD of DP coincides with DP and is transmitted downward to the point D. The ray PD is transmitted to the focal point after being reflected by the reflective surface of the steering gear. As long as the reflective surface of the focusing steering gear is large enough to receive major ultrasonic waves that are emitted in all directions due to an error and scattering and that are emitted by the measuring head into the tank, the ultrasonic waves are vertically reflected upward to the liquid surface, and echoes reflected by the liquid surface are reflected and focused on the measuring head. In this way, when the liquid level is measured at the outer side of the side wall of the vertical tank by the external level gauge and the steering gear, a problem that the echoes reflected by the liquid surface cannot be received is resolved. In addition, the echo signal is greatly enhanced due to focusing, so that measurement can be performed normally when viscosity is high and a working condition is poor. Applicable liquid types and working conditions of the external level gauge are expanded.

A broken line in FIG. 2 is an intersecting line between the reflective surface of the steering gear and an XOY coordinate plane, and the broken line is formed by connecting 2N+1 straight line segments. The reflective surface of the steering gear is not a smooth curved surface. However, when a unit angle c tends to 0 and a number N of steps of the reflective surface tend to infinity, the reflective surface of the steering gear approaches a smooth surface. Although the reflective surface of the steering gear may be a paraboloid, a more complex case of focusing or diverging to any area can be designed by the determination method provided in this embodiment but cannot be designed by a paraboloid method. In comparison with the paraboloid method, mold machining accuracy by the determination method provided in this embodiment is high. The reflective surface of the steering gear has two parameters, namely, the focal length l and the unit angle c, recorded as reflection (l, c) by the steering gear. A focal length of a reflective (150, 4) surface of the steering gear is l=150 mm, and the unit angle is c=4°. The ray source, namely, a focal point T of the reflective surface of the steering gear is located on a negative half axis of the horizontal X axis. O is the origin of coordinates, and a length of TO is l. A ray is transmitted from T to O. An intersecting line between a $0^{th}$ step reflective surface of the reflective surface of the steering gear and an OXY coordinate plane is a straight line segment, a midpoint of this segment is located at O, and an included angle between this segment and the X axis is 45°. The ray TO is vertically transmitted upward to a $P_0$ point on a horizontal liquid surface after being reflected by the $0^{th}$ reflective surface, and then is reflected by the liquid surface to form a reflected line $P_0O$. The reflected line $P_0O$ is reflected again by the $0^{th}$ step reflective surface again to form a ray OT. The ray OT is transmitted back to the ray source T. An upper right side of an N step reflective surface defined in a first quadrant is n, and n=2N+1. A lower side of an N step reflective surface defined in a third quadrant is n=2N−1. The ray emitted from the focal point is reversely transmitted to a preset direction by the reflective surface of the steering gear, that is, the ray focuses at a specified point, or is parallel to a specific direction, or diverges at a specified angle along a specific direction. The preset direction in this embodiment is vertical upward to the horizontal liquid surface.

When a drawing is drawn, it is required that an error of a length is less than 0.2 mm and an error of an angle is less than 0.5°. Coordinates $(X_0, Y_0)$ of an upper right side of the $0^{th}$ step reflective surface may be determined based on an intersection of a ray and a 45° reflective surface, where the ray is emitted from the T and a ray angle is equal to c/2. Coordinates $(X_{-0}, Y_{-0})$ of a lower left side of the $0^{th}$ reflective may be determined based on an intersection of a ray and a 45° reflective surface, where the ray is emitted from the T and a ray angle is equal to −c/2. Coordinate values of $(X_0, Y_0)$ and $(X_{-0}, Y_{-0})$ on the drawing are calculated by a geometric method. The unit angle c is an included angle between a ray from T to $(X_{N-1}, Y_{N-1})$ and a ray from T to $(X_N, Y_N)$. In this embodiment, a unit angle of each step is c. Table 1 is a datasheet of a reflective (150, 4) surface of a steering gear. As shown in Table 1, in a third column in a first quadrant, ray angles θ=(2N+1)*c/2 or θ=(2N+1)*c/2 of odd sides corresponding to step N equal 0, 1, 2, 3 . . . are 2, 6, 10, 14 . . . respectively. In a third quadrant, ray angles (2N−1)*c/2 or θ=(2N−1)*c/2 of odd sides corresponding to step N equal 0, −1, −2, −3 . . . are −2, −6, −10, −14 . . . respectively, and there is a difference c=4° between the step each. According to the determination method provided in this embodiment, the step may be divided by other methods. For example, lengths of sides of reflective surfaces at all steps may be set to be equal. In addition, coordinates of an upper right side of a 1st step reflective surface are $(X_1, Y_1)$, coordinates of an upper right side of a $2^{nd}$ step reflective surface are $(X_2, Y_2)$, coordinates of an upper right side of a $3^{rd}$ step reflective surface are $(X_3, Y_3)$, coordinates of an upper right side of a $4^{th}$ step reflective surface are $(X_4, Y_4)$, coordinates of an upper right side of an $-0^{th}$ step reflective surface are $(X_{-0}, Y_{-0})$, coordinates of an upper right side of a $-1^{st}$ step reflective surface are $(X_{-1}, Y_{-1})$, coordinates of an upper right side of a $-2^{nd}$ step reflective surface are $(X_{-2}, Y_{-2})$, coordinates of an upper right side of a $-3^{rd}$ step reflective surface are $(X_{-3}, Y_{-3})$, coordinates of an upper right side of a $-4^{th}$ step reflective surface are $(X_{-4}, Y_{-4})$, and coordinates of an upper right side of a $-5^{th}$ step reflective surface are $(X_{-5}, Y_{-5})$.

Figure 3:
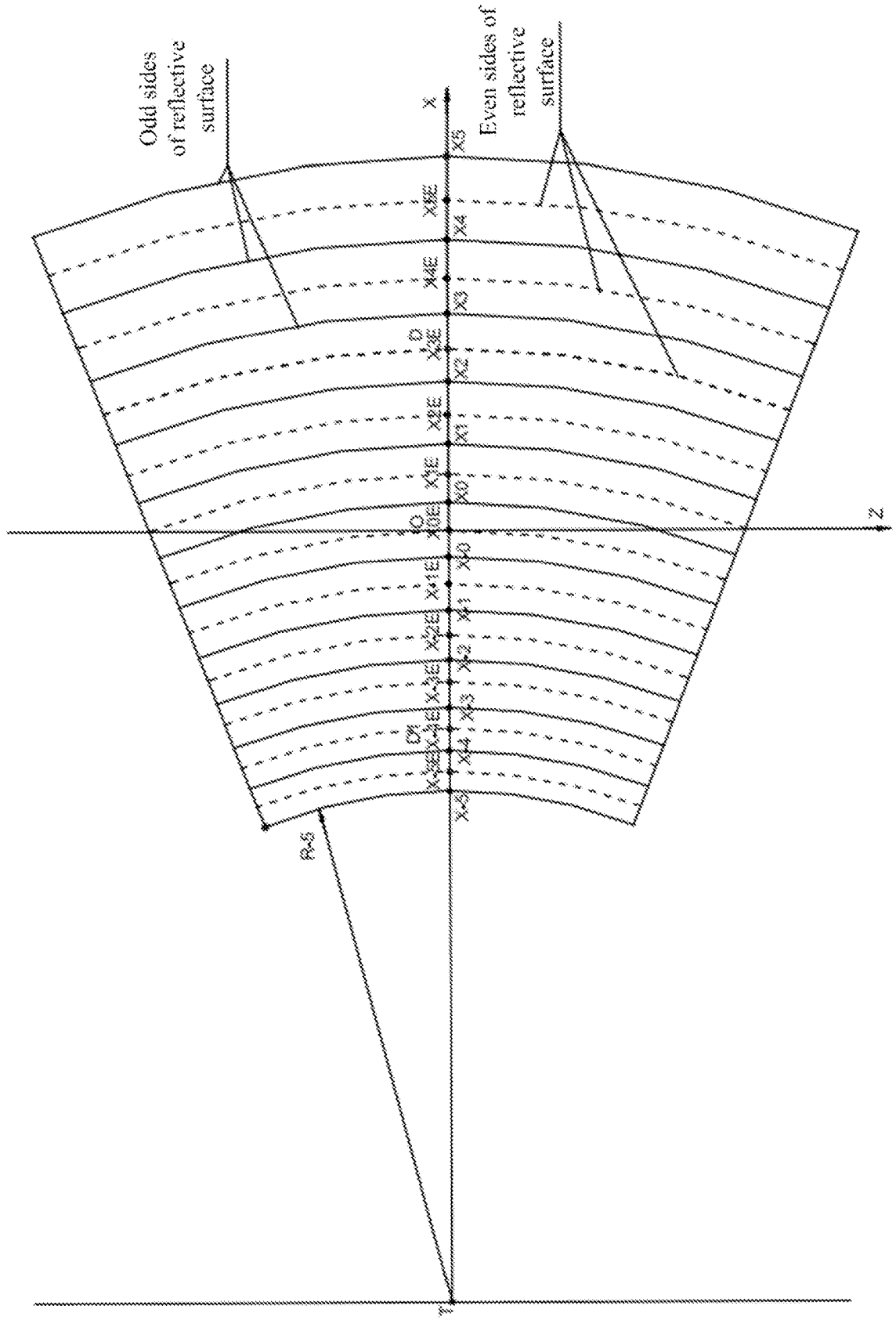
FIG. 3 is a top view of a reflective surface of a steering gear according to the present disclosure.

Right-hand coordinates $(X_{N-1}, Y_{N-1})$ of a reflective surface at any step are determined. $(X_N, Y_N)$ is calculated by the geometric method by accurately drawing based on the unit angle c for dividing the step or a length of the step and a required direction angle of the reflected line (vertical upward in this embodiment). Specifically, a ray on which the coordinates $(X_N, Y_N)$ are located can be obtained by adding up a unit angle to the ray on the coordinates $(X_{N-1}, Y_{N-1})$, to obtain the coordinates $(X_N, Y_N)$. Although a formula $(X_N, Y_N) = F((X_{N-1}, Y_{N-1}), l, c)$ for calculating $(X_N, Y_N)$ based on $(X_{N-1}, Y_{N-1})$ is complex, the formula is universal after a division rule of the step and a direction of the reflected line are determined. After the formula is input into an EXCEL datasheet or other datasheets, as long as the parameters l and c are input, in a front view, coordinates of odd sides of the reflective surfaces at all steps may be easily calculated by a recursive method based on a property of the datasheet, to form a datasheet of a reflective (l, c) surface of the steering gear as shown in Table 1. As shown in FIG. 3, a projection of a side of each step reflective surface in the Y axis direction is arcs, for example, a lower side of the $-5^{th}$ step reflective surface is an arc with a radius of R-5.

Any ray TD that is emitted from the focal point T and of which emission angle is θ>0°, any ray TO of which emission angle is θ=0°, any ray $TD_1$ of which emission angle is θ<0°, and rays DP, $OP_0$, and $P_1D_1$ that are reflected by the reflective surface of the steering gear are all vertically transmitted upward to the horizontal liquid surface, where P, $P_0$, and $P_1$ are points on the liquid surface. Reflected lines PD, $P_0O$, and $P_1D_1$ reflected by the liquid surface are all vertically transmitted downward to the reflective surface of the steering gear, and rays DT, OT, and $D_1T$ reflected by the reflective surface of the steering gear are all transmitted to the focal point T.

An ordinal of an even side of an N step reflective surface is n=2N, and a ray angle of the even side of the N step reflective surface is Nc, where the ray angle of the even side of the N step reflective surface is an included angle between the even side of the N step reflective surface and the X axis, and the even side is an accurate reflection position of the reflective surface, that is, after a reflected line of a ray from the ray source to an even side of a reflective surface at any step is reflected by a designated horizontal plane, the reflected line may be accurately transmitted to the even side and then reflected to the ray source, and an error of the reflection angle is 0. After a mold is machined based on the coordinates of the odd sides of the reflective surfaces at all steps, edges of the odd sides of the reflective surfaces at all steps are ground off during polishing, and an accurate coordinate plane of the even side of which error of the reflection angle is 0 is retained, so that focusing of the reflective surface of the steering gear is more accurate.

For example, in Table 1 of reflective (150, 4) surface of steering gear, in the second column, for a row in which a side ordinal n is even, a fourth column corresponding to this raw is a coordinate value XNE of the even side, and a fifth column corresponding to this raw is a coordinate value YNE of the even side. In the first quadrant, for steps N equal to 0, 1, 2, 3 . . . , ordinals of even sides are 0, 2, 4, 6 . . . respectively, ray angles of the even sides are 0°, 4°, 8°, 12° . . . respectively, and coordinate values $(X_{0E}, Y_{0E})$, $(X_{1E}, Y_{1E})$, $(X_{2E}, Y_{2E})$, $(X_{3E}, Y_{3E})$ . . . of the even sides are (0.000, 0.000), (10.855, 11.248), (22.555, 24.251), (35.235, 39.373) . . . respectively. In a third quadrant, for steps N equal to 0, c1, -2, -3 . . . , ordinals of even sides are 0, -2, -4, -6 . . . respectively, ray angles of the even sides are 0°, -4°, -8°, -12° . . . respectively, and coordinate values $(X_{0E}, Y_{0E})$, $(X_{-1E}, Y_{-1E})$, $(X_{-2E}, Y_{-2E})$, $(X_{-3E}, Y_{-3E})$ . . . are (0.000, 0.000), (-10.123, -9.781), (-20.221, -18.239), (-29.637, -25.584) . . . respectively. In a front view of the reflective (150, 4) surface of the steering gear in FIG. 2, coordinates $(X_{0E}, Y_{0E})$ represent coordinates of even sides of the $0^{th}$ step reflective surface, that is, the origin O of coordinates, and coordinates $(X_{1E}, Y_{1E})$, $(X_{2E}, Y_{2E})$, $(X_{3E}, Y_{3E})$, $(X_{4E}, Y_{4E})$, $(X_{5E}, Y_{5E})$, $(X_{-1E}, Y_{-1E})$, $(X_{-2E}, Y_{-2E})$, $(X_{-3E}, Y_{-3E})$, $(X_{-4E}, Y_{-4E})$, and $(X_{-5E}, Y_{-5E})$ respectively represent coordinates of even sides of the $1^{st}$, $2^{nd}$, $3^{rd}$, $4^{th}$, $5^{th}$, $-1^{st}$, $-2^{nd}$, $-3^{rd}$, $-4^{th}$ and $-5^{th}$ reflective surfaces. In a top view of the reflective (150, 4) surface of the steering gear in FIG. 3, dotted arcs represent even sides of the reflective surfaces at all steps.

It is easy to calculate any small unit angle, that is, angle accuracy, and a coordinate table of a reflective surface of the steering gear having any multi-step reflective surface by using the datasheet on a computer. Table 2 is a datasheet of a reflective (1000, 0.2) surface of a steering gear. As shown in Table 2, a unit angle is 0.2°, and there are 240 reflective surfaces. Coordinate data show that the reflective surface of the steering gear is approximatively a smooth curved surface. After a mold is ground and polished based on the coordinate datasheet, edges of odd sides of the reflective surfaces at all steps are ground off, and accurate reflection positions of even sides are not ground off, so that angular accuracy is further improved and focusing effect is more accurate. Therefore, theoretically, the reflective surface of the steering gear calculated by this method can meet a requirement for accuracy of any angle.

If a tank wall at which the measuring head is mounted is not vertical, a partial reflective surface of the steering gear may be made based on different directions of focus rays. For example, if the tank wall is inclined outward and a direction of a ray emitted by the measuring head is upward, a focusing steering gear including only a partial upper area of the reflective surface of the steering gear can be made. If the tank wall is inclined inward and the direction of the ray emitted by the measuring head is downward, a focusing steering gear including only a partial lower area of the reflective surface of the steering gear can be made. If the tank wall is inclined leftward or rightward, and the direction of the ray emitted by the measuring head is leftward or rightward, a focusing steering gear including only a partial left or right area of the reflective surface of the steering gear can be made.

The determined method provided by this embodiment further includes a verification process. The verification process includes the following steps.

1. Accurately draw a drawing (accuracy is determined by a specific requirement, such as length accuracy is 0.2 mm and angle accuracy is 0.5°).
2. Calculate side coordinates of the $0^{th}$ step reflective surface by the geometric method and derive side coordinates of an adjacent step reflective surface based on side coordinates of the reflective surface at any step.

3. Derive a universal formula for calculating the side coordinates of the adjacent step reflective surface based on the side coordinates of the reflective surface at any step by the geometric method.
4. Input the universal formula into a spreadsheet; and based on a property of the spreadsheet, copy the side coordinates of the reflective surfaces at all steps according to the universal formula for calculating the side coordinates of the $0^{th}$ step reflective surface and the side coordinates of the adjacent step reflective surface, to easily generate, on a large scale, a datasheet of side coordinates of a reflective surface with any high accuracy requirement.
5. Measure side coordinate values of the reflective surface on the drawing, check the side coordinate values of the reflective surface calculated and generated by the datasheet, and confirm that the universal formula is correct.

For different requirements for a reflection direction, for example, parallelism, focusing, and divergence, different methods of dividing a step, for example, emission angles c corresponding to the steps are equal, or lengths of all steps are equal, and datasheets for generating odd side coordinates or even side coordinates, universal formulae for deriving side coordinates of the adjacent step reflective surface are different. Calculated coordinate values are also different. However, the five steps of the method for generating the reflective surface of the steering gear are the same.

The steering gear provided by this embodiment is mounted in a storage tank, and a focal point T of a focusing surface is disposed at an inner wall facing the measuring head, the focal point T is located on an OX coordinate axis, the XOY coordinate plane is perpendicular to the inner wall of the tank, an XOZ coordinate plane is horizontal, and an OY axis is vertical upward. The measuring head of the external level gauge is used to send, aligning at a T point, an ultrasonic wave from the outer side of the side wall of the vertical tank to an inner side of the tank, and echoes reflected by the liquid surface are focused on the measuring head near the T point. Therefore, the measuring head can receive a powerful echo signal from the liquid surface, and the liquid level of the vertical tank can be measured at the side wall by the focusing steering gear of an external level gauge.

At present, the steering gear of an external level gauge is a flat reflective surface, and an included angle between the flat reflective surface and the horizontal plane is 45°. Therefore, an error of the emission angle of the ultrasonic wave emitted from the measuring head is magnified by 8 times when the ultrasonic wave returns to the measuring head after being reflected for many times. As a result, when the liquid level is measured at the side wall of the vertical by the external level gauge and the steering gear, the liquid level cannot be measured because no echo is received. In this embodiment, the reflective surfaces at all steps are derived by a recursive method from the $0^{th}$ reflective surface to the adjacent step reflective surface, and a datasheet of a reflective surface of the steering gear with any high accuracy requirement is easily generated by using a spreadsheet. Through the steering gear determined by the datasheet, ultrasonic waves emitted from the measuring head of the external level gauge in all directions are reflected by the focusing steering gear and vertically transmitted upward to the liquid surface, and echoes reflected from the liquid surface are focused and reflected back to the liquid level measuring head. Therefore, the measuring head can accurately receive the powerful echo signal from the liquid surface. The liquid level of the vertical storage tank can be measured at the side wall by the external level gauge and the focusing steering gear. In a practical application, the focusing steering gear may be made with a paraboloid instead of the reflective surface of the steering gear. However, the paraboloid cannot reflect in a non-parallel direction. In comparison with the paraboloid, the reflective surface of the steering gear has a wider application range, higher flexibility, and higher machining accuracy.

Table 1 is a datasheet of a reflective (150, 4) surface of a steering gear. As shown in Table 1, X and Y coordinate values of the odd sides of the reflective surfaces at all steps in the front view in FIG. 2 that are measured with a ruler are completely consistent with X and Y coordinate values calculated based on the datasheet of the reflective surface of the steering gear. This proves that the method for determining a reflective surface of a steering gear is accurate. Inputs in Table 1 are the focal length 1 and the unit angle c, where the focal length is 150 mm and the unit angle is 4°. In Table 1, data in the first quadrant includes data in a range from a row with a side ordinal of 11 to a raw with a side ordinal of 1, and data in the third quadrant includes data in a range from a row with a side ordinal of −1 to a row with a side ordinal of −11.

TABLE 1

Datasheet of reflective (150, 4) surface of steering gear

First quadrant

| Step of reflective surface | Side ordinal | Ray angle of side | Coordinates of even side (mm) | | Coordinates of odd side (mm) | | Coordinates of mold (mm) | |
|---|---|---|---|---|---|---|---|---|
| N | n | $\theta = nc/2$ | $X_{NE}$ | $Y_{NE}$ | $X_N$ | $Y_N$ | $X'_N$ | $Y'_N$ |
| 5 | 11 | 22 | | | 72.601 | 89.937 | 114.949 | 12.260 |
|   | 10 | 20 | 64.222 | 77.971 | | | | |
| 4 | 9 | 18 | | | 56.639 | 67.141 | 87.539 | 7.427 |
|   | 8 | 16 | 49.057 | 57.079 | | | | |
| 3 | 7 | 14 | | | 42.146 | 47.907 | 63.687 | 4.075 |
|   | 6 | 12 | 35.235 | 39.373 | | | | |
| 2 | 5 | 10 | | | 28.895 | 31.544 | 42.743 | 1.873 |
|   | 4 | 8 | 22.555 | 24.251 | | | | |
| 1 | 3 | 6 | | | 16.705 | 17.521 | 24.206 | 0.577 |
|   | 2 | 4 | 10.855 | 11.248 | | | | |

TABLE 1-continued

Datasheet of reflective (150, 4) surface of steering gear

| N | n | θ = nc/2 | X_NE | Y_NE | X_N | Y_N | X'_N | Y'_N |
|---|---|---|---|---|---|---|---|---|
| 0 | 1 | 2 | | | 5.428 | 5.428 | 7.677 | 0.000 |
| | 0 | 0 | 0.000 | 0.000 | | | | |
| | −1 | −2 | | | −5.061 | −5.061 | −7.159 | 0.000 |
| −1 | −2 | −4 | −10.123 | −9.781 | | | | |
| | −3 | −6 | | | −15.501 | −14.136 | −20.960 | 0.965 |
| −2 | −4 | −8 | −20.221 | −18.239 | | | | |
| | −5 | −10 | | | −25.215 | −22.003 | −33.393 | 2.272 |
| −3 | −6 | −12 | −29.637 | −25.584 | | | | |
| | −7 | −14 | | | −34.299 | −28.848 | −44.658 | 3.855 |
| −4 | −8 | −16 | −38.460 | −31.984 | | | | |
| | −9 | −18 | | | −42.830 | −34.822 | −54.916 | 5.664 |
| −5 | −10 | −20 | −46.763 | −37.575 | | | | |
| | −11 | −22 | | | −50.878 | −40.048 | −64.304 | 7.659 |

| Step of reflective surface | Side ordinal | Ray Angle (°) | Coordinates of even side (mm) | | Coordinates of odd side (mm) | | Coordinates of mold (mm) | |
|---|---|---|---|---|---|---|---|---|
| N | n | θ = nc/2 | X_NE | Y_NE | X_N | Y_N | X'_N | Y'_N |

Third quadrant

Table 2 is a datasheet of a reflective (1000, 0.2) surface of a steering gear. As shown in Table 2, X and Y coordinate values of the odd sides of the reflective surfaces at all steps in the front view in FIG. 3 that are measured with a ruler are completely consistent with X and Y coordinate values calculated from the datasheet of the reflective surface of the steering gear. This proves that the method for the reflective surface of the steering gear is accurate. Inputs in Table 2 are the focal length l and the unit angle c, where the focal length is 1,000 mm and the unit angle is 0.2°. In Table 2, data in the first quadrant includes data in a range, from top to bottom, from a third raw to a raw of which an ordinal of an odd side of a reflective surface of is 1. Data in a third quadrant includes data in a range, from top to bottom, from a row of which an ordinal of an odd side of the reflective surface is −1 to a row of which an ordinal of an odd side of the reflective surface is −120.

TABLE 2

Datasheet of reflective (1000, 0.2) surface of steering gear

First quadrant

| Step of reflective surface | Ordinal of odd side of reflective surface | Ray angle of odd side (°) | X coordinate (mm) | Y coordinate (mm) | Coordinates of mold (mm) | |
|---|---|---|---|---|---|---|
| N | n = 2N + 1 | θ = nc/2 | X_N | Y_N | X'_N | Y'_N |
| 120 | 241 | 24.1 | 542.815 | 690.134 | 871.958 | 104.186 |
| 119 | 239 | 23.9 | 536.931 | 681.074 | 861.390 | 101.940 |
| 118 | 237 | 23.7 | 531.079 | 672.096 | 850.902 | 99.730 |
| 117 | 235 | 23.5 | 525.257 | 663.201 | 840.494 | 97.555 |
| 116 | 233 | 23.3 | 519.467 | 654.386 | 830.165 | 95.416 |
| 115 | 231 | 23.1 | 513.707 | 645.651 | 819.914 | 93.312 |
| 114 | 229 | 22.9 | 507.978 | 636.995 | 809.740 | 91.242 |
| 113 | 227 | 22.7 | 502.279 | 628.417 | 799.643 | 89.207 |
| 112 | 225 | 22.5 | 496.609 | 619.916 | 789.622 | 87.204 |
| 111 | 223 | 22.3 | 490.970 | 611.491 | 779.675 | 85.235 |
| 110 | 221 | 22.1 | 485.359 | 603.142 | 769.802 | 83.298 |
| 109 | 219 | 21.9 | 479.777 | 594.867 | 760.003 | 81.393 |
| 108 | 217 | 21.7 | 474.225 | 586.665 | 750.276 | 79.520 |
| 107 | 215 | 21.5 | 468.700 | 578.536 | 740.620 | 77.678 |
| 106 | 213 | 21.3 | 463.204 | 570.479 | 731.035 | 75.867 |
| 105 | 211 | 21.1 | 457.736 | 562.494 | 721.520 | 74.086 |
| 104 | 209 | 20.9 | 452.296 | 554.578 | 712.075 | 72.335 |
| 103 | 207 | 20.7 | 446.883 | 546.732 | 702.698 | 70.614 |
| 102 | 205 | 20.5 | 441.497 | 538.954 | 693.388 | 68.922 |
| 101 | 203 | 20.3 | 436.139 | 531.244 | 684.146 | 67.260 |
| 100 | 201 | 20.1 | 430.807 | 523.601 | 674.970 | 65.625 |
| 99 | 199 | 19.9 | 425.502 | 516.025 | 665.860 | 64.019 |
| 98 | 197 | 19.7 | 420.223 | 508.514 | 656.815 | 62.440 |
| 97 | 195 | 19.5 | 414.970 | 501.067 | 647.834 | 60.889 |
| 96 | 193 | 19.3 | 409.744 | 493.685 | 638.917 | 59.365 |
| 95 | 191 | 19.1 | 404.542 | 486.366 | 630.063 | 57.867 |
| 94 | 189 | 18.9 | 399.367 | 479.110 | 621.271 | 56.396 |
| 93 | 187 | 18.7 | 394.216 | 471.916 | 612.541 | 54.950 |
| 92 | 185 | 18.5 | 389.091 | 464.783 | 603.871 | 53.531 |

TABLE 2-continued

Datasheet of reflective (1000, 0.2) surface of steering gear

| | | | | | | |
|---|---|---|---|---|---|---|
| 91 | 183 | 18.3 | 383.990 | 457.711 | 595.262 | 52.136 |
| 90 | 181 | 18.1 | 378.914 | 450.699 | 586.713 | 50.767 |
| 89 | 179 | 17.9 | 373.862 | 443.745 | 578.223 | 49.422 |
| 88 | 177 | 17.7 | 368.834 | 436.851 | 569.792 | 48.102 |
| 87 | 175 | 17.5 | 363.831 | 430.014 | 561.418 | 46.806 |
| 86 | 173 | 17.3 | 358.851 | 423.235 | 553.102 | 45.533 |
| 85 | 171 | 17.1 | 353.895 | 416.512 | 544.842 | 44.284 |
| 84 | 169 | 16.9 | 348.962 | 409.846 | 536.639 | 43.058 |
| 83 | 167 | 16.7 | 344.052 | 403.235 | 528.491 | 41.855 |
| 82 | 165 | 16.5 | 339.165 | 396.679 | 520.399 | 40.674 |
| 81 | 163 | 16.3 | 334.301 | 390.177 | 512.361 | 39.516 |
| 80 | 161 | 16.1 | 329.460 | 383.729 | 504.377 | 38.380 |
| 79 | 159 | 15.9 | 324.641 | 377.334 | 496.446 | 37.265 |
| 78 | 157 | 15.7 | 319.844 | 370.991 | 488.568 | 36.172 |
| 77 | 155 | 15.5 | 315.069 | 364.701 | 480.743 | 35.100 |
| 76 | 153 | 15.3 | 310.317 | 358.462 | 472.969 | 34.049 |
| 75 | 151 | 15.1 | 305.586 | 352.274 | 465.247 | 33.019 |
| 74 | 149 | 14.9 | 300.876 | 346.136 | 457.576 | 32.009 |
| 73 | 147 | 14.7 | 296.188 | 340.048 | 449.955 | 31.019 |
| 72 | 145 | 14.5 | 291.520 | 334.010 | 442.384 | 30.049 |
| 71 | 143 | 14.3 | 286.874 | 328.020 | 434.862 | 29.099 |
| 70 | 141 | 14.1 | 282.249 | 322.079 | 427.389 | 28.168 |
| 69 | 139 | 13.9 | 277.644 | 316.185 | 419.964 | 27.256 |
| 68 | 137 | 13.7 | 273.060 | 310.339 | 412.588 | 26.364 |
| 67 | 135 | 13.5 | 268.496 | 304.539 | 405.258 | 25.490 |
| 66 | 133 | 13.3 | 263.953 | 298.786 | 397.976 | 24.634 |
| 65 | 131 | 13.1 | 259.429 | 293.078 | 390.741 | 23.797 |
| 64 | 129 | 12.9 | 254.925 | 287.416 | 383.551 | 22.978 |
| 63 | 127 | 12.7 | 250.441 | 281.799 | 376.408 | 22.177 |
| 62 | 125 | 12.5 | 245.977 | 276.226 | 369.309 | 21.393 |
| 61 | 123 | 12.3 | 241.531 | 270.698 | 362.255 | 20.627 |
| 60 | 121 | 12.1 | 237.105 | 265.212 | 355.246 | 19.878 |
| 59 | 119 | 11.9 | 232.698 | 259.770 | 348.281 | 19.146 |
| 58 | 117 | 11.7 | 228.310 | 254.371 | 341.359 | 18.430 |
| 57 | 115 | 11.5 | 223.941 | 249.014 | 334.480 | 17.732 |
| 56 | 113 | 11.3 | 219.591 | 243.698 | 327.644 | 17.049 |
| 55 | 111 | 11.1 | 215.258 | 238.424 | 320.851 | 16.383 |
| 54 | 109 | 10.9 | 210.945 | 233.191 | 314.099 | 15.733 |
| 53 | 107 | 10.7 | 206.649 | 227.999 | 307.389 | 15.099 |
| 52 | 105 | 10.5 | 202.372 | 222.846 | 300.720 | 14.480 |
| 51 | 103 | 10.3 | 198.112 | 217.734 | 294.092 | 13.877 |
| 50 | 101 | 10.1 | 193.870 | 212.661 | 287.504 | 13.289 |
| 49 | 99 | 9.9 | 189.646 | 207.626 | 280.956 | 12.716 |
| 48 | 97 | 9.7 | 185.439 | 202.631 | 274.448 | 12.158 |
| 47 | 95 | 9.5 | 181.250 | 197.673 | 267.980 | 11.615 |
| 46 | 93 | 9.3 | 177.078 | 192.754 | 261.550 | 11.086 |
| 45 | 91 | 9.1 | 172.923 | 187.872 | 255.159 | 10.572 |
| 44 | 89 | 8.9 | 168.785 | 183.027 | 248.806 | 10.072 |
| 43 | 87 | 8.7 | 164.664 | 178.219 | 242.491 | 9.586 |
| 42 | 85 | 8.5 | 160.559 | 173.447 | 236.214 | 9.114 |
| 41 | 83 | 8.3 | 156.471 | 168.711 | 229.973 | 8.656 |
| 40 | 81 | 8.1 | 152.400 | 164.011 | 223.770 | 8.211 |
| 39 | 79 | 7.9 | 148.345 | 159.346 | 217.603 | 7.780 |
| 38 | 77 | 7.7 | 144.306 | 154.716 | 211.473 | 7.362 |
| 37 | 75 | 7.5 | 140.283 | 150.121 | 205.378 | 6.957 |
| 36 | 73 | 7.3 | 136.277 | 145.560 | 199.319 | 6.566 |
| 35 | 71 | 7.1 | 132.286 | 141.034 | 193.295 | 6.187 |
| 34 | 69 | 6.9 | 128.311 | 136.541 | 187.306 | 5.820 |
| 33 | 67 | 6.7 | 124.351 | 132.081 | 181.352 | 5.467 |
| 32 | 65 | 6.5 | 120.407 | 127.654 | 175.432 | 5.125 |
| 31 | 63 | 6.3 | 116.479 | 123.260 | 169.547 | 4.796 |
| 30 | 61 | 6.1 | 112.565 | 118.899 | 163.695 | 4.479 |
| 29 | 59 | 5.9 | 108.667 | 114.570 | 157.876 | 4.174 |
| 28 | 57 | 5.7 | 104.784 | 110.272 | 152.091 | 3.881 |
| 27 | 55 | 5.5 | 100.916 | 106.006 | 146.338 | 3.600 |
| 26 | 53 | 5.3 | 97.063 | 101.771 | 140.618 | 3.330 |
| 25 | 51 | 5.1 | 93.224 | 97.568 | 134.931 | 3.072 |
| 24 | 49 | 4.9 | 89.400 | 93.395 | 129.275 | 2.825 |
| 23 | 47 | 4.7 | 85.591 | 89.252 | 123.651 | 2.589 |
| 22 | 45 | 4.5 | 81.796 | 85.139 | 118.059 | 2.365 |
| 21 | 43 | 4.3 | 78.015 | 81.056 | 112.497 | 2.151 |
| 20 | 41 | 4.1 | 74.248 | 77.003 | 106.967 | 1.948 |
| 19 | 39 | 3.9 | 70.496 | 72.979 | 101.468 | 1.756 |
| 18 | 37 | 3.7 | 66.758 | 68.984 | 95.998 | 1.575 |
| 17 | 35 | 3.5 | 63.033 | 65.018 | 90.559 | 1.404 |
| 16 | 33 | 3.3 | 59.322 | 61.080 | 85.150 | 1.243 |
| 15 | 31 | 3.1 | 55.625 | 57.171 | 79.771 | 1.093 |
| 14 | 29 | 2.9 | 51.942 | 53.289 | 74.421 | 0.953 |

TABLE 2-continued

Datasheet of reflective (1000, 0.2) surface of steering gear

| | | | | | | |
|---|---|---|---|---|---|---|
| 13 | 27 | 2.7 | 48.272 | 49.435 | 69.100 | 0.823 |
| 12 | 25 | 2.5 | 44.615 | 45.609 | 63.808 | 0.703 |
| 11 | 23 | 2.3 | 40.972 | 41.810 | 58.544 | 0.592 |
| 10 | 21 | 2.1 | 37.342 | 38.038 | 53.309 | 0.492 |
| 9 | 19 | 1.9 | 33.725 | 34.292 | 48.103 | 0.401 |
| 8 | 17 | 1.7 | 30.121 | 30.573 | 42.924 | 0.320 |
| 7 | 15 | 1.5 | 26.530 | 26.881 | 37.773 | 0.248 |
| 6 | 13 | 1.3 | 22.952 | 23.214 | 32.649 | 0.185 |
| 5 | 11 | 1.1 | 19.387 | 19.573 | 27.553 | 0.132 |
| 4 | 9 | 0.9 | 15.834 | 15.958 | 22.484 | 0.088 |
| 3 | 7 | 0.7 | 12.294 | 12.368 | 17.441 | 0.052 |
| 2 | 5 | 0.5 | 8.766 | 8.803 | 12.426 | 0.026 |
| 1 | 3 | 0.3 | 5.251 | 5.264 | 7.436 | 0.009 |
| 0 | 1 | 0.1 | 1.748 | 1.748 | 2.473 | 0.000 |
| 0 | −1 | −0.1 | −1.742 | −1.742 | −2.464 | 0.000 |
| −1 | −3 | −0.3 | −5.233 | −5.209 | −7.384 | 0.017 |
| −2 | −5 | −0.5 | −8.699 | −8.651 | −12.270 | 0.034 |
| −3 | −7 | −0.7 | −12.154 | −12.069 | −17.131 | 0.060 |
| −4 | −9 | −0.9 | −15.596 | −15.464 | −21.966 | 0.093 |
| −5 | −11 | −1.1 | −19.027 | −18.836 | −26.777 | 0.135 |
| −6 | −13 | −1.3 | −22.446 | −22.184 | −31.563 | 0.186 |
| −7 | −15 | −1.5 | −25.854 | −25.509 | −36.324 | 0.244 |
| −8 | −17 | −1.7 | −29.249 | −28.811 | −41.061 | 0.310 |
| −9 | −19 | −1.9 | −32.634 | −32.091 | −45.774 | 0.384 |
| −10 | −21 | −2.1 | −36.007 | −35.348 | −50.463 | 0.466 |
| −11 | −23 | −2.3 | −39.368 | −38.583 | −55.128 | 0.555 |
| −12 | −25 | −2.5 | −42.719 | −41.796 | −59.770 | 0.653 |
| −13 | −27 | −2.7 | −46.058 | −44.987 | −64.388 | 0.757 |
| −14 | −29 | −2.9 | −49.386 | −48.156 | −68.983 | 0.870 |
| −15 | −31 | −3.1 | −52.703 | −51.304 | −73.555 | 0.989 |
| −16 | −33 | −3.3 | −56.009 | −54.430 | −78.104 | 1.116 |
| −17 | −35 | −3.5 | −59.304 | −57.535 | −82.630 | 1.251 |
| −18 | −37 | −3.7 | −62.588 | −60.620 | −87.134 | 1.392 |
| −19 | −39 | −3.9 | −65.862 | −63.683 | −91.616 | 1.541 |
| −20 | −41 | −4.1 | −69.125 | −66.726 | −96.076 | 1.697 |
| −21 | −43 | −4.3 | −72.378 | −69.748 | −100.513 | 1.859 |
| −22 | −45 | −4.5 | −75.619 | −72.750 | −104.929 | 2.029 |
| −23 | −47 | −4.7 | −78.851 | −75.732 | −109.323 | 2.206 |
| −24 | −49 | −4.9 | −82.072 | −78.694 | −113.696 | 2.389 |
| −25 | −51 | −5.1 | −85.283 | −81.636 | −118.047 | 2.579 |
| −26 | −53 | −5.3 | −88.483 | −84.559 | −122.378 | 2.775 |
| −27 | −55 | −5.5 | −91.674 | −87.462 | −126.687 | 2.979 |
| −28 | −57 | −5.7 | −94.854 | −90.346 | −130.976 | 3.188 |
| −29 | −59 | −5.9 | −98.024 | −93.210 | −135.244 | 3.405 |
| −30 | −61 | −6.1 | −101.185 | −96.056 | −139.491 | 3.627 |
| −31 | −63 | −6.3 | −104.335 | −98.882 | −143.718 | 3.856 |
| −32 | −65 | −6.5 | −107.476 | −101.690 | −147.925 | 4.091 |
| −33 | −67 | −6.7 | −110.606 | −104.480 | −152.112 | 4.333 |
| −34 | −69 | −6.9 | −113.727 | −107.251 | −156.279 | 4.580 |
| −35 | −71 | −7.1 | −116.839 | −110.004 | −160.426 | 4.834 |
| −36 | −73 | −7.3 | −119.941 | −112.738 | −164.554 | 5.094 |
| −37 | −75 | −7.5 | −123.033 | −115.455 | −168.662 | 5.359 |
| −38 | −77 | −7.7 | −126.116 | −118.154 | −172.751 | 5.631 |
| −39 | −79 | −7.9 | −129.189 | −120.835 | −176.821 | 5.908 |
| −40 | −81 | −8.1 | −132.254 | −123.499 | −180.871 | 6.192 |
| −41 | −83 | −8.3 | −135.309 | −126.145 | −184.903 | 6.481 |
| −42 | −85 | −8.5 | −138.354 | −128.774 | −188.917 | 6.775 |
| −43 | −87 | −8.7 | −141.391 | −131.386 | −192.911 | 7.076 |
| −44 | −89 | −8.9 | −144.418 | −133.981 | −196.887 | 7.382 |
| −45 | −91 | −9.1 | −147.437 | −136.559 | −200.845 | 7.693 |
| −46 | −93 | −9.3 | −150.446 | −139.120 | −204.785 | 8.010 |
| −47 | −95 | −9.5 | −153.447 | −141.664 | −208.707 | 8.333 |
| −48 | −97 | −9.7 | −156.438 | −144.193 | −212.610 | 8.660 |
| −49 | −99 | −9.9 | −159.421 | −146.704 | −216.496 | 8.994 |
| −50 | −101 | −10.1 | −162.395 | −149.200 | −220.365 | 9.332 |
| −51 | −103 | −10.3 | −165.361 | −151.680 | −224.215 | 9.676 |
| −52 | −105 | −10.5 | −168.318 | −154.143 | −228.049 | 10.025 |
| −53 | −107 | −10.7 | −171.266 | −156.591 | −231.865 | 10.379 |
| −54 | −109 | −10.9 | −174.206 | −159.023 | −235.664 | 10.738 |
| −55 | −111 | −11.1 | −177.137 | −161.439 | −239.446 | 11.102 |
| −56 | −113 | −11.3 | −180.060 | −163.840 | −243.211 | 11.471 |
| −57 | −115 | −11.5 | −182.975 | −166.226 | −246.959 | 11.845 |
| −58 | −117 | −11.7 | −185.881 | −168.596 | −250.691 | 12.224 |
| −59 | −119 | −11.9 | −188.779 | −170.951 | −254.406 | 12.608 |
| −60 | −121 | −12.1 | −191.669 | −173.291 | −258.105 | 12.997 |
| −61 | −123 | −12.3 | −194.550 | −175.616 | −261.787 | 13.390 |
| −62 | −125 | −12.5 | −197.424 | −177.927 | −265.453 | 13.789 |
| −63 | −127 | −12.7 | −200.289 | −180.223 | −269.103 | 14.192 |

TABLE 2-continued

Datasheet of reflective (1000, 0.2) surface of steering gear

| | | | $X_N$ | $Y_N$ | $X'_N$ | $Y'_N$ |
|---|---|---|---|---|---|---|
| −64 | −129 | −12.9 | −203.147 | −182.504 | −272.737 | 14.599 |
| −65 | −131 | −13.1 | −205.997 | −184.770 | −276.356 | 15.011 |
| −66 | −133 | −13.3 | −208.838 | −187.023 | −279.958 | 15.428 |
| −67 | −135 | −13.5 | −211.672 | −189.261 | −283.545 | 15.850 |
| −68 | −137 | −13.7 | −214.498 | −191.485 | −287.117 | 16.276 |
| −69 | −139 | −13.9 | −217.317 | −193.695 | −290.673 | 16.706 |
| −70 | −141 | −14.1 | −220.127 | −195.890 | −294.213 | 17.141 |
| −71 | −143 | −14.3 | −222.930 | −198.073 | −297.739 | 17.580 |
| −72 | −145 | −14.5 | −225.726 | −200.241 | −301.249 | 18.023 |
| −73 | −147 | −14.7 | −228.514 | −202.396 | −304.745 | 18.471 |
| −74 | −149 | −14.9 | −231.294 | −204.537 | −308.226 | 18.923 |
| −75 | −151 | −15.1 | −234.067 | −206.665 | −311.691 | 19.379 |
| −76 | −153 | −15.3 | −236.832 | −208.779 | −315.143 | 19.840 |
| −77 | −155 | −15.5 | −239.591 | −210.880 | −318.579 | 20.304 |
| −78 | −157 | −15.7 | −242.342 | −212.968 | −322.001 | 20.773 |
| −79 | −159 | −15.9 | −245.085 | −215.043 | −325.409 | 21.246 |
| −80 | −161 | −16.1 | −247.822 | −217.105 | −328.802 | 21.723 |
| −81 | −163 | −16.3 | −250.551 | −219.154 | −332.182 | 22.204 |
| −82 | −165 | −16.5 | −253.273 | −221.191 | −335.547 | 22.689 |
| −83 | −167 | −16.7 | −255.988 | −223.214 | −338.898 | 23.178 |
| −84 | −169 | −16.9 | −258.696 | −225.225 | −342.236 | 23.671 |
| −85 | −171 | −17.1 | −261.397 | −227.224 | −345.559 | 24.167 |
| −86 | −173 | −17.3 | −264.091 | −229.210 | −348.869 | 24.668 |
| −87 | −175 | −17.5 | −266.778 | −231.184 | −352.165 | 25.172 |
| −88 | −177 | −17.7 | −269.458 | −233.146 | −355.448 | 25.680 |
| −89 | −179 | −17.9 | −272.131 | −235.095 | −358.717 | 26.192 |
| −90 | −181 | −18.1 | −274.798 | −237.033 | −361.973 | 26.708 |
| −91 | −183 | −18.3 | −277.458 | −238.958 | −365.216 | 27.228 |
| −92 | −185 | −18.5 | −280.111 | −240.872 | −368.446 | 27.751 |
| −93 | −187 | −18.7 | −282.757 | −242.773 | −371.662 | 28.277 |
| −94 | −189 | −18.9 | −285.397 | −244.663 | −374.866 | 28.808 |
| −95 | −191 | −19.1 | −288.031 | −246.542 | −378.057 | 29.342 |
| −96 | −193 | −19.3 | −290.657 | −248.408 | −381.235 | 29.879 |
| −97 | −195 | −19.5 | −293.278 | −250.264 | −384.400 | 30.420 |
| −98 | −197 | −19.7 | −295.891 | −252.107 | −387.552 | 30.965 |
| −99 | −199 | −19.9 | −298.499 | −253.940 | −390.692 | 31.513 |
| −100 | −201 | −20.1 | −301.100 | −255.761 | −393.820 | 32.064 |
| −101 | −203 | −20.3 | −303.695 | −257.571 | −396.935 | 32.619 |
| −102 | −205 | −20.5 | −306.283 | −259.370 | −400.038 | 33.177 |
| −103 | −207 | −20.7 | −308.865 | −261.158 | −403.128 | 33.739 |
| −104 | −209 | −20.9 | −311.441 | −262.935 | −406.207 | 34.304 |
| −105 | −211 | −21.1 | −314.011 | −264.701 | −409.273 | 34.872 |
| −106 | −213 | −21.3 | −316.574 | −266.457 | −412.327 | 35.444 |
| −107 | −215 | −21.5 | −319.132 | −268.201 | −415.370 | 36.019 |
| −108 | −217 | −21.7 | −321.683 | −269.935 | −418.400 | 36.597 |
| −109 | −219 | −21.9 | −324.229 | −271.658 | −421.419 | 37.178 |
| −110 | −221 | −22.1 | −326.768 | −273.371 | −424.427 | 37.763 |
| −111 | −223 | −22.3 | −329.301 | −275.074 | −427.422 | 38.351 |
| −112 | −225 | −22.5 | −331.829 | −276.766 | −430.406 | 38.941 |
| −113 | −227 | −22.7 | −334.350 | −278.447 | −433.379 | 39.535 |
| −114 | −229 | −22.9 | −336.866 | −280.119 | −436.340 | 40.132 |
| −115 | −231 | −23.1 | −339.376 | −281.780 | −439.290 | 40.733 |
| −116 | −233 | −23.3 | −341.880 | −283.431 | −442.229 | 41.336 |
| −117 | −235 | −23.5 | −344.379 | −285.072 | −445.156 | 41.942 |
| −118 | −237 | −23.7 | −346.871 | −286.703 | −448.073 | 42.551 |
| −119 | −239 | −23.9 | −349.358 | −288.325 | −450.978 | 43.164 |
| −120 | −241 | −24.1 | −351.840 | −289.936 | −453.873 | 43.779 |

| N | n = 2N − 1 | θ = nb | $X_N$ | $Y_N$ | $X'_N$ | $Y'_N$ |
|---|---|---|---|---|---|---|
| Step of reflective surface | Ordinal of odd side of reflective surface | Ray angle of odd side (°) | X coordinate (mm) | Y coordinate (mm) | Coordinates of mold (mm) | |

Third quadrant

Embodiments of the present disclosure are described in detail above with reference to the accompanying drawings, but the present disclosure is not limited to the above embodiments. Within the knowledge of a person of ordinary skill in the art, various variations can also be made without departing from the spirit of the present disclosure.

What is claimed is:

1. A method for determining a reflective surface of a steering gear, comprising:

obtaining a focal length and a specific reflection angle, wherein the focal length is a distance between a ray source and a center of the reflective surface of the steering gear, and the specific reflection angle is an exit angle of an ultrasonic wave reflected by the reflective surface of the steering gear;

determining a $0^{th}$ step reflective surface of the reflective surface of the steering gear based on the focal length and the specific reflection angle, which specifically comprises:

determining a unit angle of the reflective surface of the steering gear based on the focal length, wherein the unit angle is an included angle between a first side and a second side, the first side is a connecting line between a first end point of a longitudinal section of each step reflective surface and the ray source, and the second side is a connecting line between a second end point of the longitudinal section of each step reflective surface and the ray source;

determining an inclination angle of the $0^{th}$ step reflective surface of the reflective surface of the steering gear based on the specific reflection angle, wherein the inclination angle of the $0^{th}$ step reflective surface of the reflective surface of the steering gear is an included angle between the $0^{th}$ step reflective surface of the reflective surface of the steering gear and a horizontal plane;

determining side coordinates of the $0^{th}$ step reflective surface of the reflective surface of the steering gear based on the focal length, the unit angle, and the inclination angle of the $0^{th}$ step reflective surface of the reflective surface of the steering gear; and determining the $0^{th}$ step reflective surface of the reflective surface of the steering gear based on the side coordinates of the $0^{th}$ step reflective surface;

determining an adjacent step reflective surface by a geometric method based on the $0^{th}$ step reflective surface, wherein the adjacent step reflective surface comprises a positive step reflective surface and a negative step reflective surface, wherein the determining an adjacent step reflective surface by a geometric method based on the $0^{th}$ step reflective surface specifically comprises:

determining side coordinates of the adjacent step reflective surface by a reflection law based on the unit angle and the side coordinates of the $0^{th}$ step reflective surface; and determining the adjacent step reflective surface based on the side coordinates of the adjacent step reflective surface; and if a number of steps of the reflective surface of the steering gear reaches a preset value, determining the reflective surface of the steering gear based on the $0^{th}$ step reflective surface and the adjacent step reflective surface;

wherein the determining an adjacent step reflective surface by a geometric method based on the $0^{th}$ step reflective surface specifically comprises:

determining a unit length of the reflective surface of the steering gear based on the focal length, wherein the unit length is a longitudinal cross-sectional length of each step reflective surface;

determining the side coordinates of the adjacent step reflective surface by the reflection law based on the unit length and the $0^{th}$ step reflective surface; and determining the adjacent step reflective surface based on the side coordinates of the adjacent step reflective surface.

2. The method for determining a reflective surface of a steering gear according to claim 1, wherein the determining side coordinates of the adjacent step reflective surface by a reflection law based on the unit angle and the side coordinates of the $0^{th}$ step reflective surface specifically comprises:

if a number N of steps of the reflective surface is a positive integer, determining the side coordinates of the adjacent step reflective surface based on the unit angle according to the following equations:

$$(X_N, Y_N) = F((X_{N-1}, Y_{N-1}), l, c),$$

$$(X_0, Y_0) = (X_{+0}, Y_{+0}), \text{ where}$$

$(X_N, Y_N)$ represents side coordinates of an $N^{th}$ step reflective surface, $(X_{N-1}, Y_{N-1})$ represents side coordinates of an $(N-1)^{th}$ step reflective surface, c represents the unit angle, l represents the focal length, $(X_0, Y_0)$ represents side coordinates of the $0^{th}$ reflective surface, and $(X_{+0}, Y_{+0})$ represents side coordinate values of the $0^{th}$ step reflective surface in a first quadrant; or if the number N of steps of the reflective surface is a negative integer, determining the side coordinates of the adjacent step reflective surface based on the unit angle according to the following equations:

$$(X_N, Y_N) = F((X_{N+1}, Y_{N+1}), l, c),$$

$$(X_0, Y_0) = (X_{-0}, Y_{-0}), \text{ where}$$

$(X_{N+1}, Y_{N+1})$ represents side coordinates of an $(N+1)^{th}$ step reflective surface, and $(X_{-0}, Y_{-0})$ represents side coordinate values of the $0^{th}$ step reflective surface in a third quadrant.

3. The method for determining a reflective surface of a steering gear according to claim 2, wherein after the determining the reflective surface of the steering gear based on the $0^{th}$ step reflective surface and the adjacent step reflective surface, the method further comprises:

storing the side coordinates, the focal length, and the unit angle of the adjacent step reflective surface into a database, wherein the database is configured to inquire the reflective surface of the steering gear.

4. A focusing steering gear of an external level gauge, comprising a reflective surface of a steering gear determined by the method for determining a reflective surface of a steering gear according to any one of claim 1, wherein the included angle between the $0^{th}$ step reflective surface of the reflective surface of the steering gear and a horizontal plane is a specific angle, to enable a direction of the ultrasonic wave reflected by the reflective surface of the steering gear to be a preset direction; a midpoint of the $0^{th}$ step reflective surface of the reflective surface of the steering gear and the ray source are located in a same horizontal plane; the ray source is disposed on a concave side of the reflective surface of the steering gear; and a transverse cross section of the reflective surface of the steering gear is an arc surface.

5. The focusing steering gear of an external level gauge according to claim 4, wherein a first side edge and a second side edge of the reflective surface of the steering gear are respectively in contact with an inner surface of a side wall of a liquid tank; the first side edge is a connecting line between end points on arc-shaped sides of adjacent step reflective surfaces of the reflective surface of the steering gear; and the second side edge is a connecting line of end points on other sides of the arc-shaped sides of the adjacent step reflective surfaces of the reflective surface of the steering gear.

6. The focusing steering gear of an external level gauge according to claim 4, wherein the reflective surface of the steering gear comprises the $0^{th}$ step reflective surface and the negative step reflective surface.

7. The focusing steering gear of an external level gauge according to claim 4, wherein the reflective surface of the steering gear comprises the $0^{th}$ step reflective surface and the positive step reflective surface.

8. The focusing steering gear of an external level gauge according to claim 7, wherein the determining side coordinates of the adjacent step reflective surface by a reflection law based on the unit angle and the side coordinates of the $0^{th}$ step reflective surface specifically comprises:

if a number N of steps of the reflective surface is a positive integer, determining the side coordinates of the adjacent step reflective surface based on the unit angle according to the following equations:

$$(X_N, Y_N) = F((X_{N-1}, Y_{N-1}), l, c),$$

$$(X_0, Y_0) = (X_{+0}, Y_{+0}), \text{ where}$$

$(X_N, Y_N)$ represents side coordinates of an $N^{th}$ step reflective surface, $(X_{N-1}, Y_{N-1})$ represents side coordinates of an $(N-1)^{th}$ step reflective surface, c represents the unit angle, l represents the focal length, $(X_0, Y_0)$ represents side coordinates of the $0^{th}$ reflective surface, and $(X_{+0}, Y_{+0})$ represents side coordinate values of the $0^{th}$ step reflective surface in a first quadrant; or if the number N of steps of the reflective surface is a negative integer, determining the side coordinates of the adjacent step reflective surface based on the unit angle according to the following equations:

$$(X_N, Y_N) = F((X_{N+1}, Y_{N+1}), l, c),$$

$$(X_0, Y_0) = (X_{-0}, Y_{-0}), \text{ where}$$

$(X_{N+1}, Y_{N+1})$ represents side coordinates of an $(N+1)^{th}$ step reflective surface, and $(X_{-0}, Y_{-0})$ represents side coordinate values of the $0^{th}$ step reflective surface in a third quadrant.

9. The focusing steering gear of an external level gauge according to claim 8, wherein a first side edge and a second side edge of the reflective surface of the steering gear are respectively in contact with an inner surface of a side wall of a liquid tank; the first side edge is a connecting line between end points on arc-shaped sides of adjacent step reflective surfaces of the reflective surface of the steering gear; and the second side edge is a connecting line of end points on other sides of the arc-shaped sides of the adjacent step reflective surfaces of the reflective surface of the steering gear.

10. The focusing steering gear of an external level gauge according to claim 8, wherein the reflective surface of the steering gear comprises the $0^{th}$ step reflective surface and the negative step reflective surface.

11. The focusing steering gear of an external level gauge according to claim 8, wherein the reflective surface of the steering gear comprises the $0^{th}$ step reflective surface and the positive step reflective surface.

12. The focusing steering gear of an external level gauge according to claim 8, wherein after the determining the reflective surface of the steering gear based on the $0^{th}$ step reflective surface and the adjacent step reflective surface, the method further comprises:

storing the side coordinates, the focal length, and the unit angle of the adjacent step reflective surface into a database, wherein the database is configured to inquire the reflective surface of the steering gear.

13. The focusing steering gear of an external level gauge according to claim 12, wherein the reflective surface of the steering gear comprises the $0^{th}$ step reflective surface and the negative step reflective surface.

14. The focusing steering gear of an external level gauge according to claim 12, wherein the reflective surface of the steering gear comprises the $0^{th}$ step reflective surface and the positive step reflective surface.

15. The focusing steering gear of an external level gauge according to claim 12, wherein a first side edge and a second side edge of the reflective surface of the steering gear are respectively in contact with an inner surface of a side wall of a liquid tank; the first side edge is a connecting line between end points on arc-shaped sides of adjacent step reflective surfaces of the reflective surface of the steering gear; and the second side edge is a connecting line of end points on other sides of the arc-shaped sides of the adjacent step reflective surfaces of the reflective surface of the steering gear.

\* \* \* \* \*